(12) United States Patent
Nakano et al.

(10) Patent No.: US 10,215,124 B2
(45) Date of Patent: Feb. 26, 2019

(54) FUEL INJECTION CONTROL DEVICE (71) Applicant: DENSO CORPORATION, Kariya, Aichi-pref. (JP)

(72) Inventors: Kosuke Nakano, Kariya (JP); Hiroshi Katsurahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/125,712

(22) PCT Filed: Mar. 19, 2015

(86) PCT No.: PCT/JP2015/001533
§ 371 (c)(1),
(2) Date: Sep. 13, 2016

(87) PCT Pub. No.: WO2015/146090
PCT Pub. Date: Oct. 1, 2015

(65) Prior Publication Data
US 2017/0002765 A1  Jan. 5, 2017

(30) Foreign Application Priority Data

Mar. 27, 2014 (JP) ................. 2014-065701

(51) Int. Cl.
*F02D 41/24* (2006.01)
*F02D 41/34* (2006.01)
(Continued)

(52) U.S. Cl.
CPC ......... *F02D 41/2467* (2013.01); *F02D 41/34* (2013.01); *F02M 51/061* (2013.01);
(Continued)

(58) Field of Classification Search
CPC .... F02D 41/2467; F02D 41/34; F02D 41/402; F02M 65/005; F02M 51/061; F02M 45/02; Y02T 10/44
See application file for complete search history.

(56) References Cited

U.S. PATENT DOCUMENTS 5,231,962 A * 8/1993 Osuka ................... F02D 41/062
 123/179.16
6,053,150 A * 4/2000 Takahashi ........... F02D 41/2438
 123/300
(Continued)

FOREIGN PATENT DOCUMENTS

JP 4604959 1/2011
JP 2013108422 A * 6/2013 ........... F02D 41/247

*Primary Examiner* — Hung Q Nguyen
*Assistant Examiner* — Brian P Monahon
(74) *Attorney, Agent, or Firm* — Nixon & Vanderhye PC (57) ABSTRACT

A fuel injection control device is a control device controlling an injection of fuel by a fuel injector and includes: a setting part that sets a request injection quantity of an injection quantity requested of the fuel injector; a dividing part that divides the request injection quantity set by the setting part into a specified injection quantity and an adjusting injection quantity other than the specified injection quantity; an injection performing part that performs a dividing injection of an adjusting injection and a partial lift injection by the fuel injector, the adjusting injection injecting the adjusting injection quantity of fuel, the partial lift injection finishing a lift of a valve body of the fuel injector in a partial lift state before the valve body reaching a full lift position and injecting the specified injection quantity of fuel; and a learning part that learns an injection characteristic of the fuel injector at the time of the partial lift injection.

12 Claims, 10 Drawing Sheets (51) Int. Cl.
*F02M 51/06* (2006.01)
*F02M 65/00* (2006.01)
*F02M 45/02* (2006.01)
*F02D 41/40* (2006.01)

(52) U.S. Cl.
CPC ......... *F02M 65/005* (2013.01); *F02D 41/402* (2013.01); *F02M 45/02* (2013.01); *Y02T 10/44* (2013.01)

(56) References Cited

U.S. PATENT DOCUMENTS

| | | | | |
|---|---|---|---|---|
| 6,062,201 | A * | 5/2000 | Nozawa | F02D 13/0219 123/478 |
| 6,192,863 | B1 * | 2/2001 | Takase | F02D 41/3809 123/357 |
| 6,349,702 | B1 * | 2/2002 | Nishiyama | F02D 41/3836 123/447 |
| 6,401,703 | B1 * | 6/2002 | Mamiya | F02D 31/008 123/295 |
| 2002/0117149 | A1 * | 8/2002 | Igashira | F02D 41/008 123/446 |
| 2003/0071613 | A1 | 4/2003 | Schultz et al. | |
| 2005/0257777 | A1 * | 11/2005 | Ishizuka | F02D 41/20 123/480 |
| 2006/0005816 | A1 * | 1/2006 | Ishizuka | F02D 41/1401 123/467 |
| 2007/0056563 | A1 * | 3/2007 | Kanne | F02D 41/2096 123/478 |
| 2007/0112502 | A1 * | 5/2007 | Asano | F02D 41/1498 701/111 |
| 2008/0017173 | A1 * | 1/2008 | Fujii | F02D 41/1497 123/478 |
| 2008/0243358 | A1 * | 10/2008 | Kojima | F02D 35/025 701/102 |
| 2008/0308065 | A1 * | 12/2008 | Imai | F02D 41/1497 123/299 |
| 2009/0013962 | A1 * | 1/2009 | Ashizawa | F02B 23/101 123/306 |
| 2009/0107225 | A1 * | 4/2009 | Ishizuka | F02D 41/1498 73/114.15 |
| 2009/0211553 | A1 * | 8/2009 | Mattes | F02D 41/2451 123/299 |
| 2009/0326788 | A1 * | 12/2009 | Yuasa | F02D 41/3809 701/104 |
| 2011/0040474 | A1 * | 2/2011 | Hiratani | F02D 41/0085 701/104 |
| 2011/0106409 | A1 * | 5/2011 | Walter | F02D 41/2432 701/103 |
| 2011/0226214 | A1 * | 9/2011 | Ogata | F02B 23/104 123/299 |
| 2012/0191325 | A1 * | 7/2012 | Haskara | F02D 35/023 701/104 |
| 2012/0255524 | A1 * | 10/2012 | Budiscak | F02D 41/08 123/480 |
| 2013/0325301 | A1 * | 12/2013 | Gautier | F02D 41/2438 701/104 |
| 2014/0311459 | A1 * | 10/2014 | Katsurahara | F02D 41/247 123/478 |
| 2014/0366848 | A1 | 12/2014 | Fujii et al. | |
| 2015/0377172 | A1 * | 12/2015 | Higuchi | F02D 41/3094 123/472 |
| 2016/0245211 | A1 | 8/2016 | Katsurahara et al. | |
| 2018/0209370 | A1 * | 7/2018 | Moriyama | F02D 45/00 |
| 2018/0223766 | A1 * | 8/2018 | Nakano | F02D 41/20 |

\* cited by examiner

FUEL INJECTION CONTROL DEVICE

CROSS REFERENCE TO RELATED APPLICATION

This application is the U.S. national phase of International Application No. PCT/JP2015/001533 filed on Mar. 19, 2015 which designated the U.S. and claims priority to Japanese Patent Application No. 2014-65701 filed on Mar. 27, 2014, the entire contents of each of which are hereby incorporated by reference.

TECHNICAL FIELD

The present disclosure relates to a device that controls an injection of fuel by a fuel injector.

BACKGROUND ART

In recent years, an emission regulation has been strengthened and a minimum injection quantity (Qmin) of fuel by a fuel injector has been required to be reduced. There has been known a technique to use a partial lift range (range in which the valve body is brought into a partial lift state before the valve body reaching a full lift position) of a needle (valve body) of the fuel injector in order to reduce the minimum injection quantity (Qmin). In this range, the minimum injection quantity (Qmin) is greatly affected by a difference in an injection characteristic caused by an individual difference of the fuel injector. For this reason, the injection characteristic at the time of the partial lift injection is learned and an injection command value is corrected on the basis of a learned result.

For example, there is proposed a technique that compares a driving voltage UM of a solenoid with a reference voltage UR generated by filtering the driving voltage UM by a low pass filter to thereby detect an armature position of the solenoid on the basis of an intersection of them.

As shown in Patent Literature 1, the fuel injector is driven in such a way as to inject a request quantity of fuel. For this reason, even if the injection characteristic at the time of the partial injection is tried to be learned, a state in which the partial lift injection is performed results in being limited.

RELATED ART LITERATURE

Patent Literature

[Patent Literature 1]
US 2003/0071613 A1

SUMMARY OF INVENTION

An object of the present disclosure is to provide a fuel injection control device that can increase an opportunity to learn an injection characteristic at the time of a partial lift injection.

According to one aspect of the present disclosure, a fuel injection control device includes: a setting part that sets a request injection quantity of an injection quantity requested of a fuel injector; a dividing part that divides the request injection quantity set by the setting part into a specified injection quantity and an adjusting injection quantity other than the specified injection quantity; an injection performing part that performs a dividing injection of an adjusting injection and a partial lift injection by the fuel injector, the adjusting injection injecting the adjusting injection quantity of fuel, the partial lift injection finishing a lift of a valve body of the fuel injector in a partial lift state before the valve body reaching a full lift position and injecting the specified injection quantity of fuel; and a learning part that learns an injection characteristic of the fuel injector at the time of the partial lift injection.

According to the configuration described above, the request injection quantity that is an injection quantity requested of the fuel injector is set. The request injection quantity is divided into the specified injection quantity and the adjusting injection quantity other than the specified injection quantity. Then, the dividing injection including the adjusting injection, which injects the adjusting injection quantity of fuel, and the partial lift injection, which injects the specified injection quantity of fuel, is performed by the fuel injector.

For this reason, even in the case where the request injection quantity is an injection quantity in which the partial lift injection is not to be performed, the partial lift injection is performed and at the same time the injection quantity is made up for by the adjusting injection quantity, whereby the request injection quantity can be satisfied. Then, the injection characteristic of the fuel injector at the time of the partial lift injection can be learned. Hence, irrespective of the request injection quantity, the partial lift injection can be performed and hence an opportunity to learn the injection characteristic of the fuel injector at the time of the partial lift injection can be increased.

In this regard, the adjusting injection quantity of fuel may be injected by one adjusting injection or may be injected by a plurality of adjusting injections. Further, the specified injection quantity of fuel may be injected by one partial lift injection or may be injected by a plurality of partial lift injections.

EMBODIMENTS FOR CARRYING OUT INVENTION

Hereinafter, one embodiment will be described with reference to the drawings. The present embodiment embodies the present disclosure as a control system that controls a gasoline engine for a vehicle.

Figure 1:
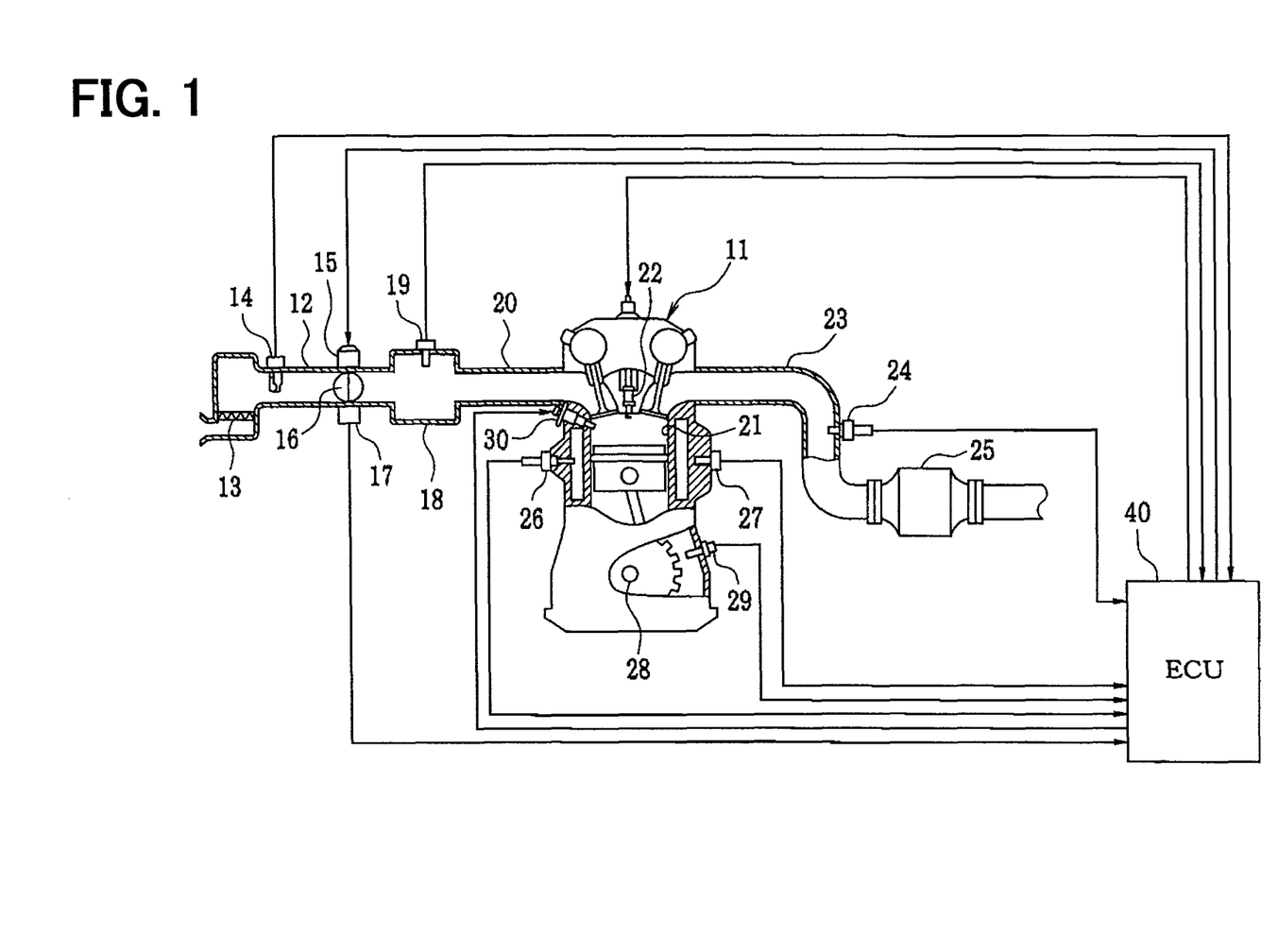
FIG. 1 is a diagram to show a general configuration of an engine control system.

First, a general configuration of an engine control system on the basis of FIG. 1.

An engine 11 that is a multi-cylinder internal combustion engine of a direct injection type has an air cleaner 13 provided at the most upstream portion of an intake pipe 12 thereof, and an air flow meter 14 to detect an intake air quantity is provided on the downstream side of the air cleaner 13. On the downstream side of the air flow meter 14 are provided a throttle valve 16, the opening of which is regulated by a motor 15, and a throttle position sensor 17 which senses a position (throttle position) of the throttle valve 16.

On the downstream side of the throttle valve 16 is provided a surge tank 18, and the surge tank 18 is provided with an intake pressure sensor 19 to sense an intake pressure. To the surge tank 18 is coupled an intake manifold 20 to introduce air into respective cylinders 21 of the engine 11, and the respective cylinders 21 of the engine 11 are provided with fuel injectors 30 to introduce air into the respective cylinders 21. A cylinder head of the engine 11 has ignition plugs 22 fixed to the respective cylinders 21, and an air-fuel mixture in each cylinder 21 is ignited by a spark discharge of the ignition plug 22 of each cylinder 21.

An exhaust pipe 23 of the engine 11 is provided with an emission gas sensor 24 (air-fuel ratio sensor, oxygen sensor, or the like) to sense an air-fuel ratio or a rich/lean state of the air-fuel mixture on the basis of an emission gas, and a catalyst 25 of a three-way catalyst or the like to clean the emission gas is provided on the downstream side of the emission gas sensor 24.

A cylinder block of the engine 11 is provided with a coolant-temperature sensor 26 to sense a cooling water temperature and a knock sensor 27 to sense knocking. A crankshaft 28 has crank angle sensor 29, which outputs a pulse signal every time when the crankshaft 28 rotates a specified crank angle, provided on the peripheral side thereof a, and a crank angle and an engine speed are sensed on the basis of the output signal of the crank angle sensor 29.

The outputs of these kinds of sensors are inputted to an electronic control unit (ECU) 40. The ECU 40 is mainly constructed of a microcomputer and executes various kinds of programs for controlling the engine, which are stored in a built-in ROM (storage medium), thereby controlling a fuel injection quantity, an ignition timing, a throttle opening (intake air quantity), and the like according to an engine driving state.

Figure 2:
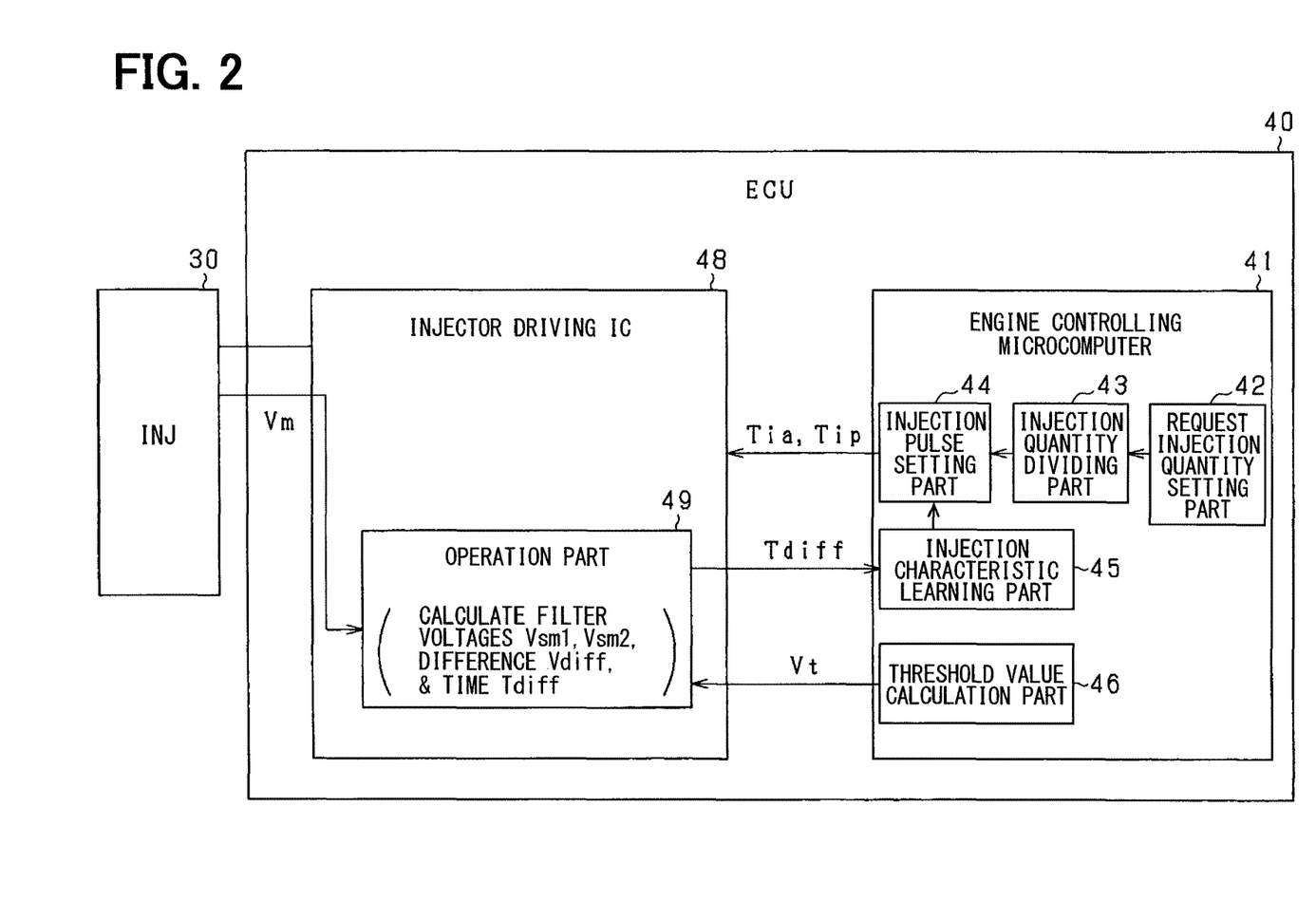
FIG. 2 is a block diagram to show a configuration of an ECU.

As shown in FIG. 2, the ECU 40 is provided with an engine controlling microcomputer 41 (microcomputer for controlling the engine 11), an injector driving IC 48 (IC for driving the fuel injector 30), and the like. The ECU 40 calculates a request injection quantity according to the engine driving state (for example, an engine speed, an engine load, and the like) and calculates an injection pulse Ti (injection period) according to the request injection quantity and opens the fuel injector 30 at the injection pulse Ti according to the request injection quantity by the injector driving IC 48, thereby injecting fuel of the request injection quantity. The injector driving IC 48 has a minus terminal voltage Vm of the fuel injector 30 inputted thereto at the time of driving the fuel injector 30.

In the present embodiment, a request injection quantity setting part 42 (setting part) sets the request injection quantity, and an injection quantity dividing part 43 (dividing part) divides the set request injection quantity into a specified injection quantity and an adjusting injection quantity other than the specified injection quantity. Then, an injection pulse setting part 44 sets an injection pulse Tia corresponding to the adjusting injection quantity and an injection pulse Tip corresponding to the specified injection quantity. The injector driving IC 48 makes the fuel injector 30 perform a dividing injection (dividing injection for learning) of an adjusting injection, which injects an adjusting injection quantity of fuel, and a partial lift injection, which finishes lifting a valve body in a partial lift state before the valve body of the fuel injector 30 reaching a full lift position and injects a specified injection quantity of fuel, on the basis of the set injection pulses Tia, Tip (injection command values). Then, an injection characteristic learning part 45 (learning part) learns a valve closing timing (injection characteristic) of the fuel injector 30 at the time of the partial lift injection. An injection pulse setting part 44 (correction part) corrects the injection pulse Tip to the fuel injector 30 at the time of the partial lift injection on the basis of the valve closing timing learned by the injection characteristic learning part 45. In this regard, an injection performing part is constructed of the injection pulse setting part 44 and the injector driving IC 48.

Figure 3:
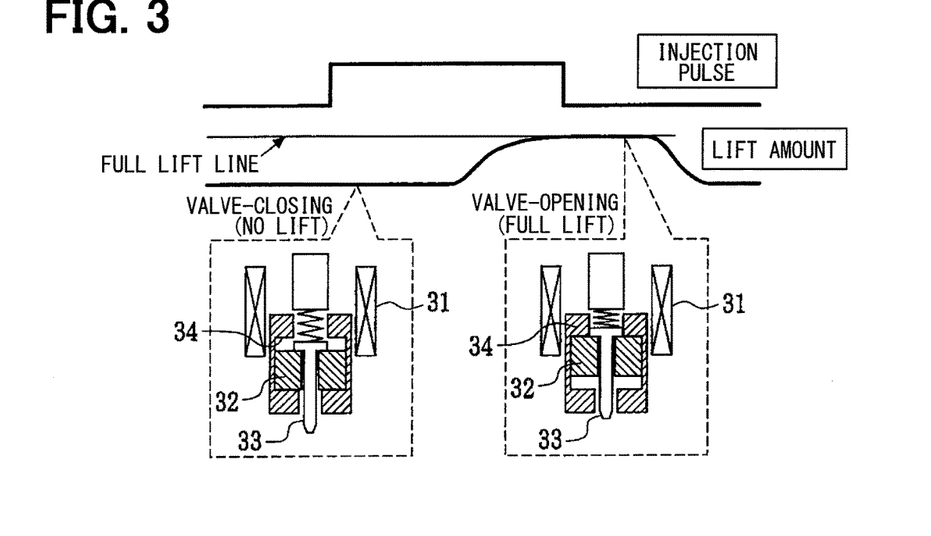
FIG. 3 is a diagram to show a full lift state of a fuel injector.
Figure 4:
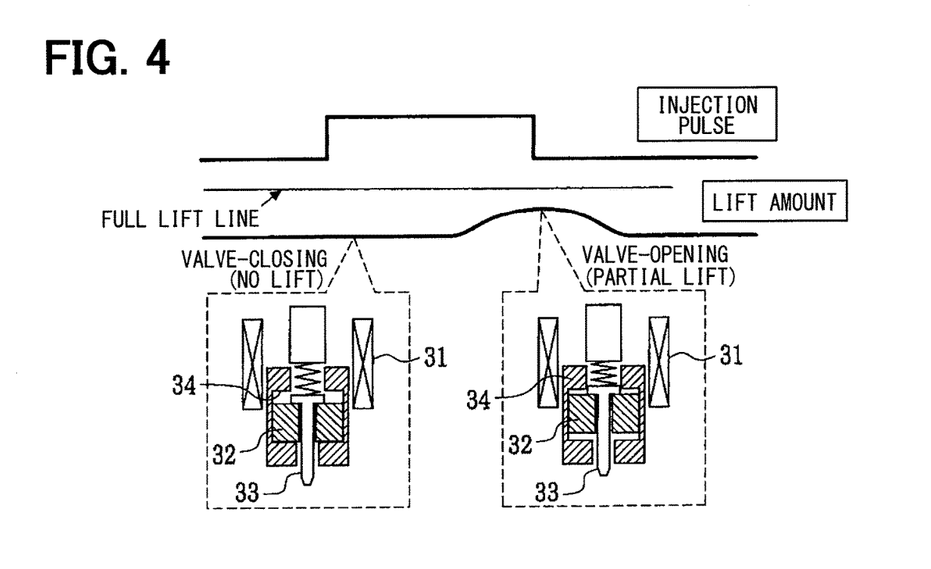
FIG. 4 is a diagram to show a partial lift state of the fuel injector.

As shown in FIG. 3 and FIG. 4, the fuel injector 30 is constructed in the following manner: that is, when the fuel injector 30 has an injection pulse inputted thereto and has a current passed through a driving coil 31 (solenoid) thereof, a needle 33 (valve body) is driven integrally with a plunger 32 (moving core) in a valve opening direction by an electromagnetic force generated by the driving coil 31. As shown in FIG. 3, in a full lift range (range in which a lift amount of the needle 33 becomes a full lift amount) in which an injection pulse width becomes comparatively long, the needle 33 reaches a full lift position (position in which the plunger 32 abuts on a stopper 34). In contrast to this, as shown in FIG. 4, in a partial lift range (range in which the lift amount of the needle 33 reaches a partial lift amount) in which the injection pulse width becomes comparatively short, there is brought about a partial lift state in which the needle 33 does not reach the full lift position (state in which the plunger 32 does not yet abut on the stopper 34).

Figure 5:
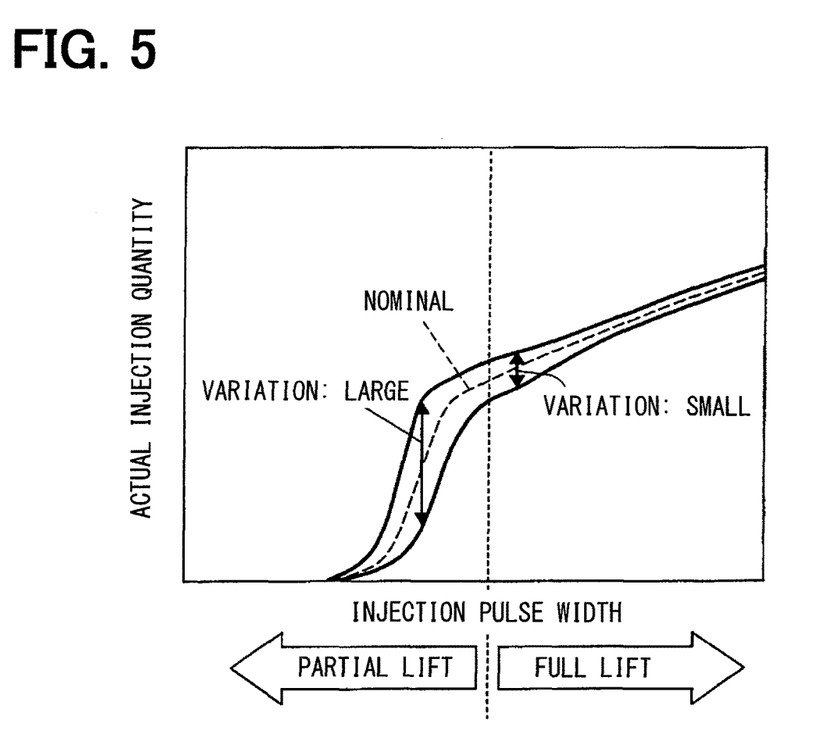
FIG. 5 is a graph to show a relationship between an injection pulse width and an actual injection quantity of the fuel injector.

The fuel injector 30 of the engine 11 to inject the fuel of high pressure into the cylinder, as shown in FIG. 5, tends to become worse in the linearity of a change characteristic of an actual injection quantity to an injection pulse width in the partial lift range. In this partial lift range, variations in the lift amount of the needle 33 tend to become larger and hence variations in the injection quantity tend to become larger. Then, when the variations in the injection quantity become larger, exhaust emission and drivability are likely to become worse.

Figure 9:
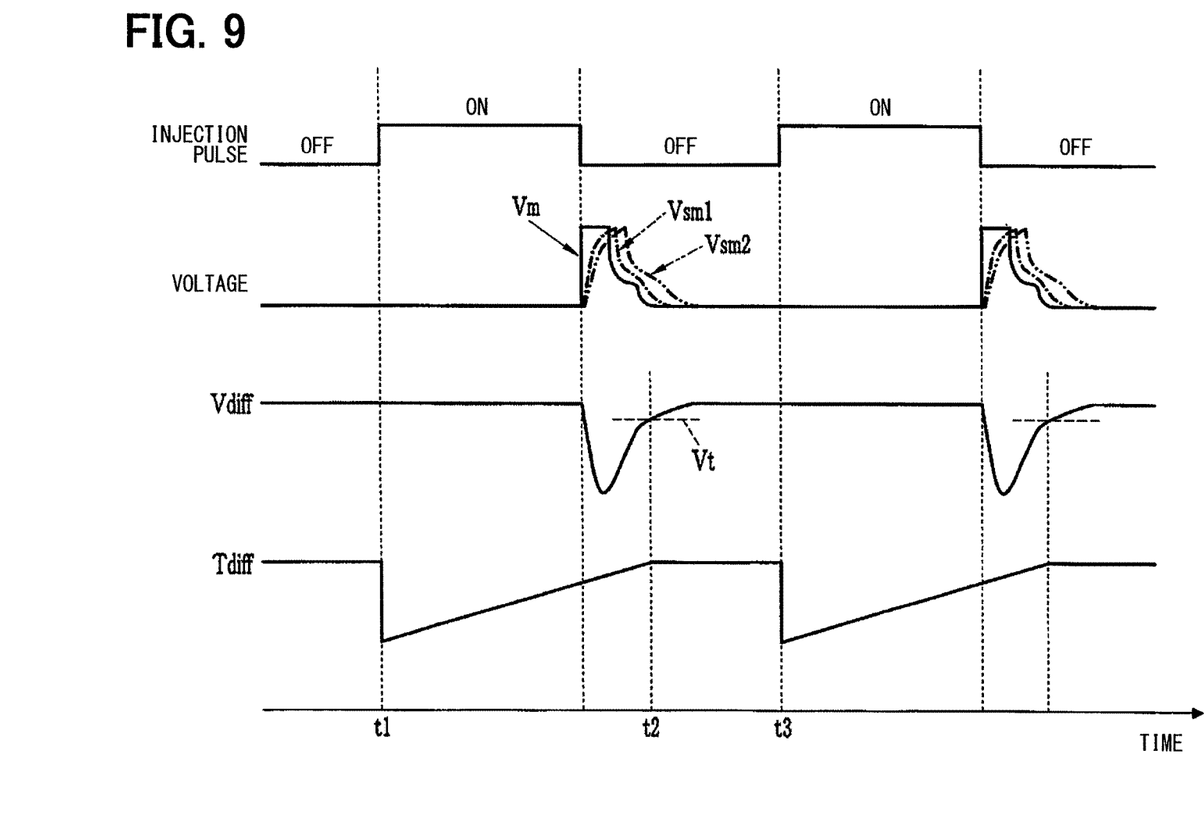
FIG. 9 is a time chart to show an example of performing a voltage inflection point time calculation.

By the way, the fuel injector 30 has the minus terminal voltage Vm changed by an induced electromotive force after the injection pulse is turned off (see FIG. 9). At this time, when the fuel injector 30 is closed, a change speed of the needle 33 (change speed of the plunger 32) is changed comparatively greatly and the change characteristic of the minus terminal voltage Vm is changed, which hence causes a voltage inflection point in which the change characteristic of the minus terminal voltage Vm is changed near a valve closing timing.

Figure 8:
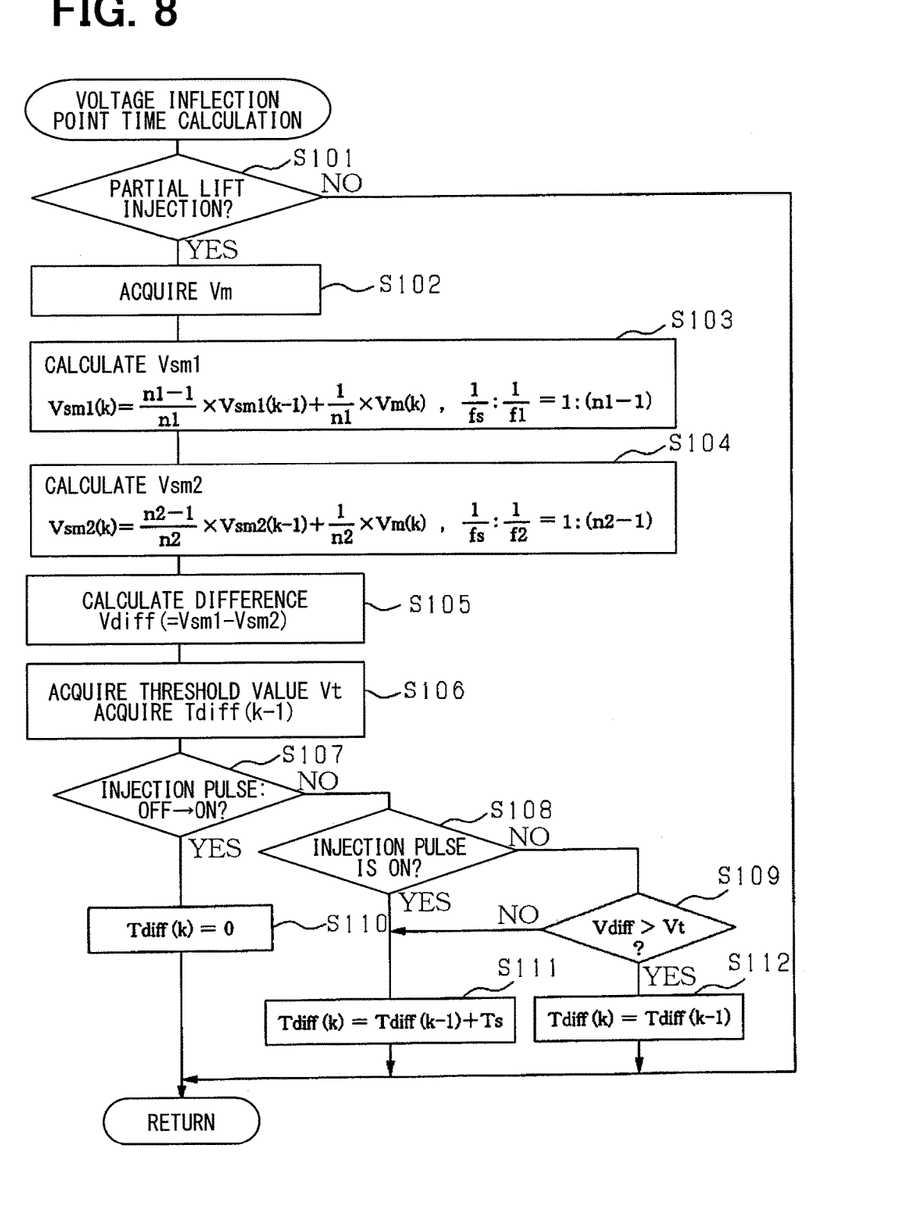
FIG. 8 is a flow chart to show a processing procedure of a voltage inflection point time calculation routine.

By focusing on this characteristic, in the present embodiment, the ECU 40 executes a voltage inflection point time calculation routine shown in FIG. 8, which will be described later, thereby calculating a voltage inflection point time as a parameter to identify a valve closing timing in the following manner.

The ECU 40 calculates a first filter voltage Vsm1 by an operation part 49 of the injector driving IC 48 during performing the partial lift injection (at least after the injection pulse of the partial lift injection is turned off), the first filter voltage Vsm1 being generated by filtering (smoothing) the minus terminal voltage Vm of the fuel injector 30 by a first low pass filter in which a first frequency f1 lower than a frequency of a noise component is made a cut-off frequency. The ECU 40 calculates a second filter voltage Vsm2 generated by filtering (smoothing) the minus terminal voltage Vm of the fuel injector 30 by a second low pass filter in which a second frequency f2 lower than the first frequency f1 is made a cut-off frequency. In this way, the first filter voltage Vsm1 in which the noise component is removed from the minus terminal voltage Vm and the second filter voltage Vsm2 for detecting the voltage inflection point can be calculated.

Further, the ECU 40 calculates a difference Vdiff_ (=Vsm1−Vsm2) between the first filter voltage Vsm1 and the second filter voltage Vsm2 by the operation part 49 of the injector driving IC 48 and then calculates a time which passes from a specified base timing to a timing when the difference Vdiff becomes an inflection point as a voltage inflection point time Tdiff. At this time, in the present embodiment, the voltage inflection point time Tdiff is calculated by using a timing when the difference Vdiff becomes larger than a specified threshold valve Vt as the timing when the difference Vdiff becomes the inflection point. In other words, the time which passes from the specified base timing to the timing when the difference Vdiff becomes larger than the specified threshold valve Vt is calculated as the voltage inflection point time Tdiff. In this way, the voltage inflection point time Tdiff changed according to the valve closing timing of the fuel injector 30 can be calculated with high accuracy. In the present embodiment, the voltage inflection point time Tdiff is calculated by using a timing when the injection pulse of the partial lift injection is switched from off to on as the base timing. In this regard, the specified threshold value Vt is calculated according to a fuel pressure or a fuel temperature by a threshold value calculation part 46 of the engine controlling microcomputer 41. Alternatively, the specified threshold value Vt may be a fixed value which is set in advance.

Figure 6:
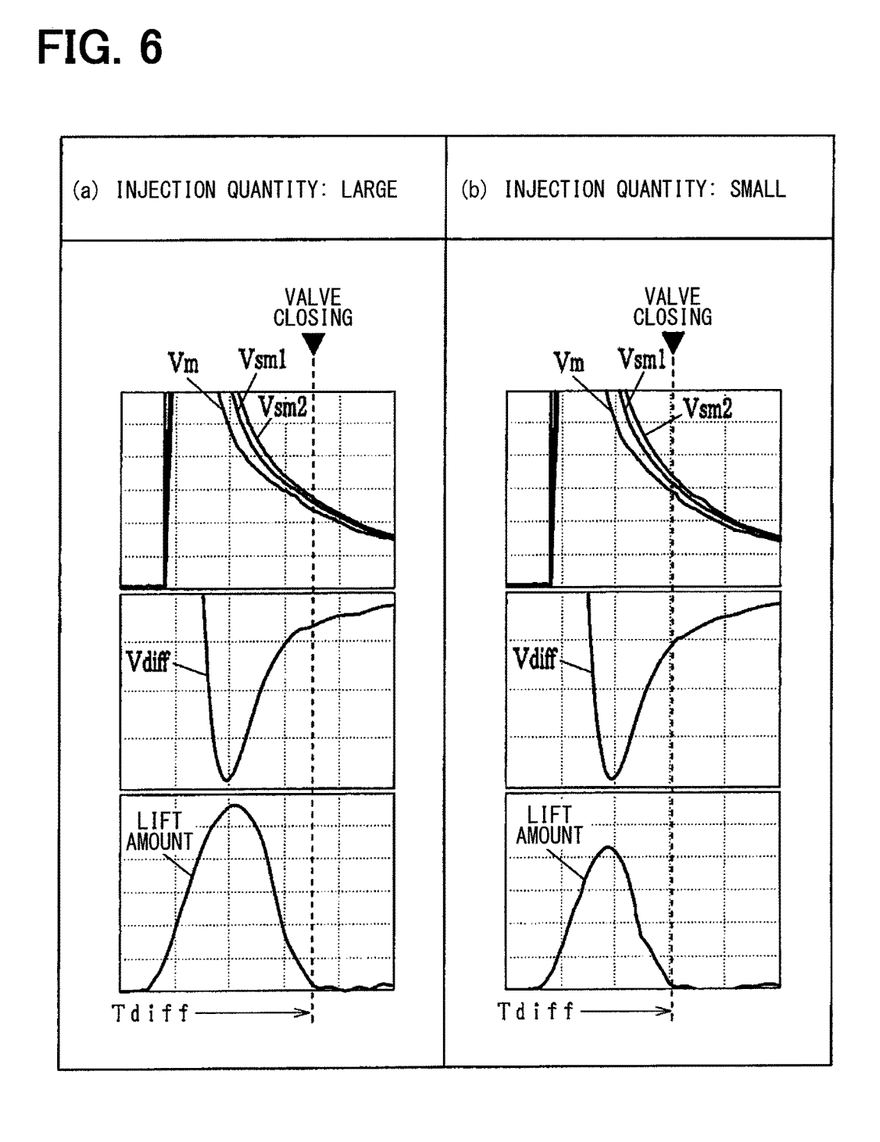
FIG. 6 is a time chart to show a relationship between an injection quantity and a valve closing timing of the fuel injector.
Figure 7:
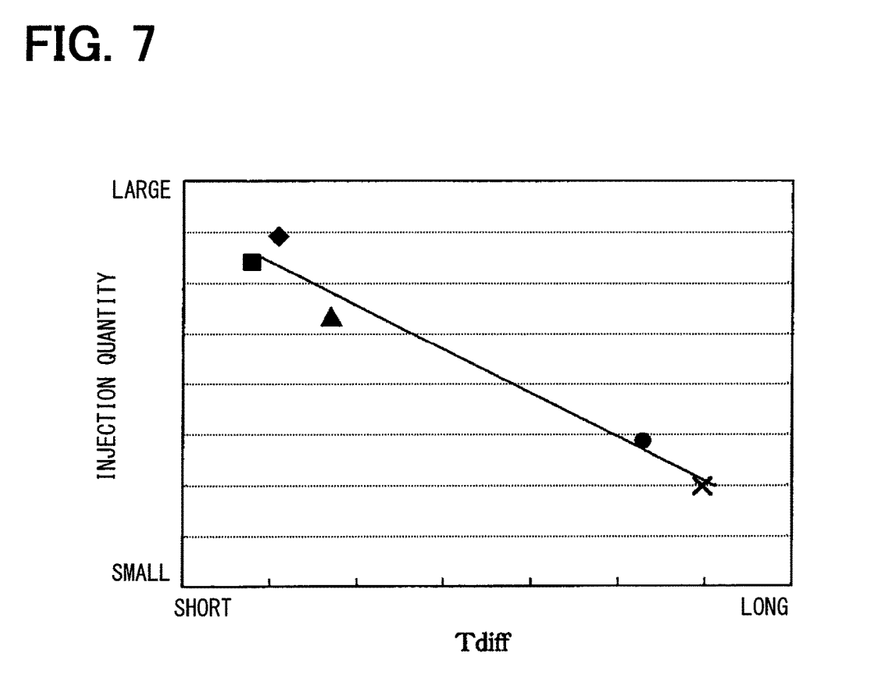
FIG. 7 is a graph to show a relationship between a voltage inflection point time and an injection quantity of the fuel injector.

Further, in the partial lift range of the fuel injector 30, as shown in FIG. 6, the valve closing timing is varied by the variations in the lift amount of the fuel injector 30, which hence varies the injection quantity. For this reason, there is a correlation between the valve closing timing and the injection quantity of the fuel injector 30. Still further, the voltage inflection point time Tdiff is changed according to the valve closing timing of the fuel injector 30, so that as shown in FIG. 7, there is a correlation between the voltage inflection point time Tdiff and the injection quantity.

By focusing on this correlation, the ECU 40 corrects the injection pulse of the partial lift injection on the basis of the voltage inflection point time Tdiff by an injection pulse setting part 44 of the engine controlling microcomputer 41. In this way, the injection pulse of the partial lift injection can be corrected with high accuracy, which hence can improve the control accuracy of the injection quantity by the partial lift injection.

Next, a processing procedure of the voltage inflection point time calculation routine will be described with reference to a flow chart shown in FIG. 8. These series of processing steps are executed by the ECU 40 (at least one of the engine controlling microcomputer 41 and the injector driving IC 48) at an operation period Ts during a period in which the ECU 40 is energized (for example, during a period in which an ignition switch is on).

First, at step 101, it is determined whether or not the partial lift injection is being performed (including a specified time before and after the injection). In the case where it is determined in this step 101 that the partial lift injection is not being performed, the present routine is finished without performing the processing steps after step 102.

In contrast to this, in the case where it is determined in the step 101 that the partial lift injection is being performed, the procedure proceeds to step 102 where the minus terminal voltage Vm of the fuel injector 30 is acquired. In this case, the operation period Ts of the present routine becomes a sampling period of the minus terminal voltage Vm.

Then, the procedure proceeds to step 103 where the minus terminal voltage Vm of the fuel injector 30 is filtered by the first low pass filter in which the first frequency f1 lower than the frequency of the noise component is made the cut-off frequency (low pass filter in which a frequency band lower than the cut-off frequency f1 is made a passband), whereby the first filter voltage Vsm1 is calculated.

The first low pass filter is a digital filter embodied by the following equation (1) which finds the current value Vsm1($k$) of the first filter voltage by the use of the previous value Vm1($k$−1) of the first filter voltage and the current value Vm($k$) of the minus terminal voltage.

$$Vsm1(k)=\{(n1-1)/n1\}\times Vsm1(k-1)+(1/n1)\times Vm(k) \qquad (1)$$

A time constant n1 of the first low pass filter is set in such a way as to satisfy the relationship of the following equation (2) that uses a sampling frequency fs (=1/Ts) of the minus terminal voltage Vm and the cut-off frequency f1 of the first low pass filter.

$$1/fs:1/f1=1:(n1-1) \qquad (2)$$

Then, the procedure proceeds to step 104 where the minus terminal voltage Vm of the fuel injector 30 is filtered by the second low pass filter in which the second frequency f2 lower than the first frequency f1 is made the cut-off frequency (low pass filter in which a frequency band lower than the cut-off frequency f2 is made a passband), whereby the second filter voltage Vsm2 is calculated.

The second low pass filter is a digital filter embodied by the following equation (3) which finds the current value Vsm2($k$) of the second filter voltage by the use of the previous value Vm2($k$−1) of the second filter voltage and the current value Vm($k$) of the minus terminal voltage.

$$Vsm2(k)=\{(n2-1)/n2\}\times Vsm2(k-1)+(1/n2)\times Vm(k) \qquad (3)$$

A time constant n2 of the second low pass filter is set in such a way as to satisfy the relationship of the following equation (4) that uses the sampling period fs (=1/Ts) of the minus terminal voltage Vm and the cut-off frequency f2 of the second low pass filter.

$$1/fs:1/f2=1:(n2-1) \qquad (4)$$

Then, the procedure proceeds to step 105 where the difference Vdiff (=Vsm1−Vsm2) between the first filter voltage Vsm1 and the second filter voltage Vsm2. In this regard, a minus component may be extracted by performing a guard processing so as to prohibit the difference Vdiff from being not less than "0".

Then, the procedure proceeds to step 106 where the specified threshold value Vt is acquired and where the previous value Tdiff(k−1) of the voltage inflection point time.

Then, the procedure proceeds to step 107 where it is determined whether or not this is a timing when the injection pulse is switched from off to on. In the case where it is determined in this step 107 that this is the timing when the injection pulse is switched from off to on, the procedure proceeds to step 110 where the current value Tdiff(k) of the voltage inflection point time is reset to "0".

$$T\text{diff}(k)=0$$

In contrast to this, in the case where it is determined in this step 107 that this is not the timing when the injection pulse is switched from off to on, the procedure proceeds to step 108 where it is determined whether or not the injection pulse is on. In the case where it is determined in this step 108 that the injection pulse is on, the procedure proceeds to step 111 where a specified value Ts (operation period Ts) is added to the previous value Tdiff(k−1) of the voltage inflection point time, whereby the current value Tdiff(k) of the voltage inflection point time is calculated. In other words, the voltage inflection point time Tdiff is counted up.

$$T\text{diff}(k)=T\text{diff}(k-1)+Ts$$

Then, in the case where it is determined in the step 108 that the injection pulse is not on (in other words, the injection pulse is off), the procedure proceeds to step 109 where it is determined whether or not the difference Vdiff between the first filter voltage Vsm1 and the second filter voltage Vsm2 is more than the specified threshold value Vt (whether or not a state in which the difference Vdiff is smaller than the specified threshold value Vt is changed to a state in which the difference Vdiff is larger than the specified threshold value Vt).

In the case where it is determined in this step 109 that the difference Vdiff between the first filter voltage Vsm1 and the second filter voltage Vsm2 is not more than the specified threshold value Vt, the procedure proceeds to step 111 where processing to count up the voltage inflection point time Tdiff is continuously performed.

Then, in the case where it is determined in the step 109 that the difference Vdiff between the first filter voltage Vsm1 and the second filter voltage Vsm2 is more than the specified threshold value Vt, it is determined that the calculation of the voltage inflection point time Tdiff is finished and then the procedure proceeds to step 112 where the current value Tdiff(k) of the voltage inflection point time Tdiff is held in the previous value Tdiff(k−1).

$$T\text{diff}(k)=T\text{diff}(k-1)$$

As described above, the time which passes from the timing (base timing) when the injection pulse is switched from off to on to the timing when the difference Vdiff becomes more than the specified threshold value Vt is calculated as the voltage inflection point time Tdiff and the calculated value of the voltage inflection point time Tdiff is held until the next base timing.

Next, an example of calculating the voltage inflection point time will be described with reference to a time chart shown in FIG. 9.

During performing the partial lift injection (at least after the injection pulse of the partial lift injection is turned off), the first filter voltage Vsm1 which is generated by filtering the minus terminal voltage Vm of the fuel injector 30 by the first low pass filter is calculated and the second filter voltage Vsm2 which is generated by filtering the minus terminal voltage Vm of the fuel injector 30 by the second low pass filter is calculated. Further, the difference Vdiff (=Vsm1−Vsm2) between the first filter voltage Vsm1 and the second filter voltage Vsm2 is calculated.

The voltage inflection point time Tdiff is reset to "0" as the timing (base timing) t1 when the injection pulse is switched from off to on and the calculation of the voltage inflection point time Tdiff is started. Then, the processing of counting up the voltage inflection point time Tdiff is repeatedly performed at the specified operation period Ts.

Then, the calculation of the voltage inflection point time Tdiff is finished at a timing t2 when the difference Vdiff between the first filter voltage Vsm1 and the second filter voltage Vsm2 becomes larger than the specified threshold value Vt after the injection pulse is turned off. In this way, the time which passes from the timing t1 (base timing) when the injection pulse is switched from off to on to the timing t2 when the difference Vdiff becomes more than the specified threshold value Vt is calculated as the voltage inflection point time Tdiff.

The calculated value of the voltage inflection point time Tdiff is held until a next base timing t3. The voltage inflection point time Tdiff is acquired from the injector driving IC 48 by the engine controlling microcomputer 41 within a period from the timing t2 when the calculation of the voltage inflection point time Tdiff is finished to the next base timing t3.

In general, the adjusting injection quantity injected by the adjusting injection described above is larger than a specified injection quantity injected by the partial lift injection. For this reason, when the adjusting injection is performed after the partial lift injection, it is difficult to secure a time necessary for the fuel injected by the adjusting injection to be atomized. As the result, the combustion state of the fuel is likely to be impaired. Hence, in the present embodiment, the adjusting injection is performed before the partial lift injection.

However, after the injection of the fuel is performed by the fuel injector 30, the motion of the needle 33 (plunger 32) is continued and a magnetic flux remains in the driving coil 31 until a specified time passes. When the next injection is performed by the fuel injector 30 before a state change in the needle 33 is settled, the next injection of the fuel injector 30 is affected by the state change in the needle 33 (driving coil 31). As the result, the voltage inflection point time Tdiff (injection characteristic of the fuel injector 30) at the time of the partial lift injection is likely to be not learned correctly. Hence, in the present embodiment, a specified interval in which the state change in the needle 33 by the adjusting injection is settled is set between the adjusting injection and the partial lift injection.

Figure 10:
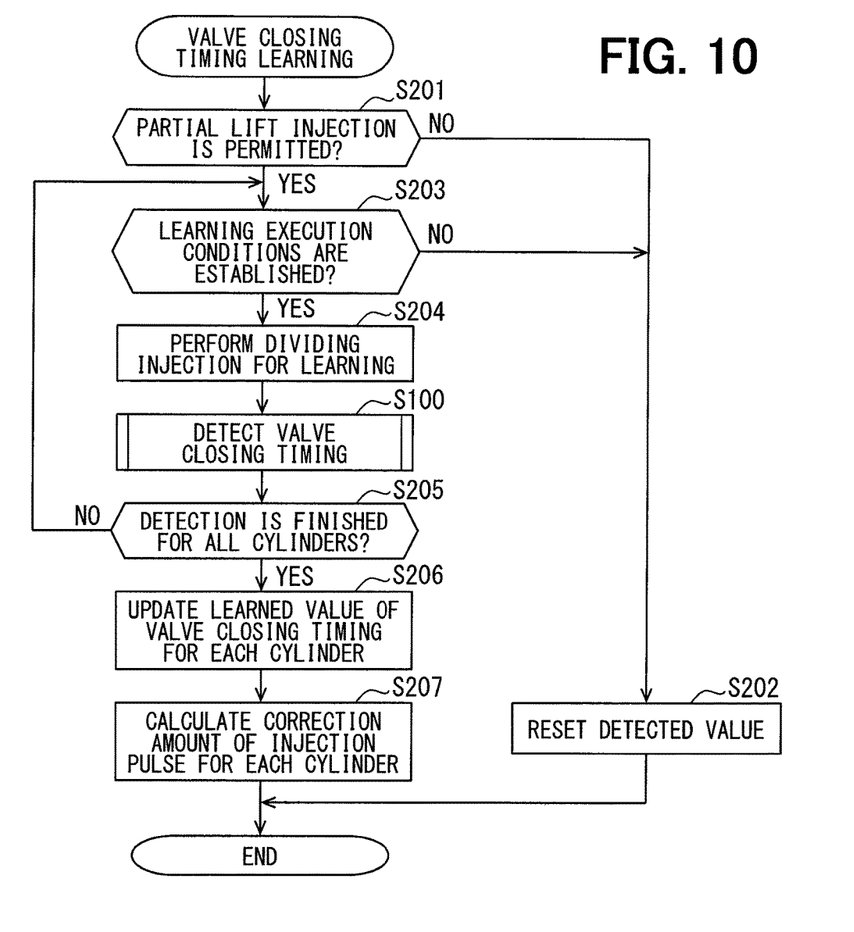
FIG. 10 is a flow chart to show a processing procedure of a valve closing timing learning routine.

Next, a processing procedure of a valve closing timing learning routine including the voltage inflection point time calculation routine shown in FIG. 8 will be described with reference to FIG. 10. These series of processing steps are performed by the ECU 40 at a specified period.

First, it is determined in step 201 whether or not the partial lift injection is permitted. Specifically, in the case where the partial lift injection has a great influence on the combustion of the fuel in the engine 11, for example, in the case of a fail-safe state, the partial lift injection is not permitted. In contrast to this, in the case where the partial lift injection little has a little influence on the combustion of the fuel in the engine 11, for example, in the case of a steady driving state, the partial lift injection is permitted. In the case where it is determined in this step 201 that the partial lift injection is not permitted, the procedure proceeds to step 202 where the voltage inflection point time Tdiff(k) is reset. In this case, a learned value of the voltage inflection point time Tdiff(k) is not updated.

In contrast to this, in the case where it is determined in the step 201 that the partial lift injection is permitted, the procedure proceeds to step 203 where it is determined whether or not the learning execution conditions of the valve closing timing are established. The learning execution conditions include that the revolution speed and the load of the engine 11 are respectively within specified ranges, that variations in the revolution speed and variations in the load of the engine 11 are respectively within specified variation ranges in a learning period, that the water temperature of the engine 11 is not less than a specified temperature, that the temperature of the ECU 40 and the temperature of the driving coil 31 are respectively within specified ranges, and that variations in the temperature of the ECU 40 and variations in the temperature of the driving coil 31 are respectively within specified variation ranges during a learning period. In other words, it is the learning execution conditions that the engine 11 is in a specified driving state. Also in the case where it is determined in this step 203 that the learning execution conditions of the valve closing timing are not established, the procedure proceeds to step 202 where the voltage inflection point time Tdiff(k) is reset.

Figure 11:
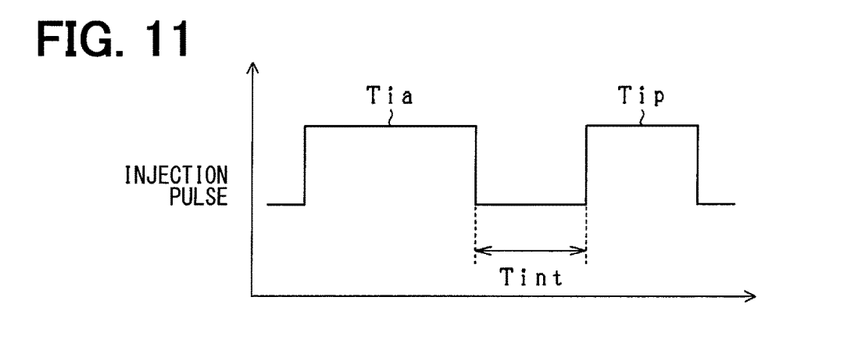
FIG. 11 is a time chart to show an injection pulse and an injection interval.

In contrast to this, in the case where it is determined in the step 203 that the learning execution conditions of the valve closing timing are established, the procedure proceeds to step 204 where the dividing injection for learning the valve closing timing is performed by the fuel injector 30. Specifically, as shown in FIG. 11, the adjusting injection quantity of fuel is injected by an injection pulse Tia of the adjusting injection and then at the timing when an injection interval Tint passes, the specified injection quantity of fuel is injected by the injection pulse Tip which is the partial lift injection. An amount by which the lift of the needle 33 is finished at a specified position just before the needle 33 reaching the full lift position is set as the specified injection quantity. Then, the adjusting injection quantity is set in such a way that the total sum of the adjusting injection quantity and the specified injection quantity becomes the request injection quantity. Further, the injection interval Tint is set to the specified interval described above in which the state change in the needle 33 by the adjusting injection is settled.

Then, in step 100, the voltage inflection point time Tdiff(k), that is, a parameter to identify the valve closing timing is detected. The processing of this step 100 is the processing in steps 101 to 112 shown in FIG. 8.

Then, it is determined in step 205 whether or not the detection of the voltage inflection point time Tdiff(k) is finished for all cylinders 21. In the case where it is determined in this step 205 that the detection of the voltage inflection point time Tdiff(k) is not finished for all cylinders 21, the procedure is again performed from the processing of step 203.

In contrast to this, in the case where it is determined in the step 205 that the detection of the voltage inflection point time Tdiff(k) is finished for all cylinders 21, the procedure proceeds to step 206 where the learned value of the voltage inflection point time Tdiff(k) is updated for the fuel injector 30 of each cylinder 21. Specifically, the learned value of the voltage inflection point time Tdiff(k) is updated by adding a value, which is acquired by multiplying a learned value Tdiff(k−1) of the previous voltage inflection point time by a specified weight and a value, which is acquired by multiplying a voltage inflection point time Tdiff(k) detected currently by another specified weight (smoothing processing). In this case, the learned value of the voltage inflection point time Tdiff(k) is updated for the fuel injectors 30 of all cylinders 21. In this regard, in the case where the learned value of the voltage inflection point time Tdiff(k) is not updated for the fuel injectors 30 of all cylinders 21, the procedure proceeds from the step 203 to the step 202, whereby the voltage inflection point time Tdiff(k) is reset and the learned value of the voltage inflection point time Tdiff(k) is not updated.

Then, in step 207, the correction amount of the injection pulse Tip in the partial lift injection to drive the fuel injector 30 of each cylinder 21 is calculated on the basis of the learned value of the voltage inflection point time Tdiff(k). Then, this processing procedure is finished.

The present embodiment described above in detail has the following advantages.

The request injection quantity is divided into the specified injection quantity and the adjusting injection quantity other than the specified injection quantity. Then, the dividing injection of the adjusting injection, which injects the adjusting quantity of fuel, and the partial lift injection, which injects the specified quantity of fuel, is performed by the fuel injector 30. For this reason, even in the case where the request injection quantity is not an injection quantity in which the partial lift injection is not to be performed, it is possible to satisfy the request injection quantity by performing the partial lift injection and at the same time by making up for the injection quantity by the adjusting injection quantity. Then, the injection characteristic of the fuel injector 30 at the time of the partial lift injection is learned. Hence, irrespective of the request injection quantity, the partial lift injection can be performed and hence an opportunity to learn the injection characteristic at the time of the partial lift injection can be increased.

The adjusting injection is performed before the partial lift injection. For this reason, the time necessary for atomizing the fuel injected by the adjusting injection can be easily secured. As the result, even in the case where the dividing injection of the adjusting injection and the partial lift injection is performed, it is possible to restrain the combustion state of the fuel from being impaired.

The injection interval Tint in which the state change in the needle 33 by the adjusting injection is settled is set between the adjusting injection and the partial lift injection. For this reason, after the state change in the needle 33 by the adjusting injection is settled, the partial lift injection can be performed and hence the injection characteristic at the time of the partial lift injection can be correctly learned.

As the specified injection quantity which is injected by the partial lift injection is set an amount in which the lift of the needle 33 is finished at the specified position just before the needle 33 reaching the lift position. For this reason, the lift amount of the needle 33 by the partial lift injection can be increased as much as possible and hence the accuracy with which the injection characteristic is learned can be improved.

There is a correlation between the injection quantity of the fuel by the fuel injector 30 and a timing (valve closing timing) when the needle 33 returns to a lift start position. For this reason, by learning a parameter (voltage infection point time Tdiff(k)) that identifies the timing when the needle 33 returns to the lift start position, the injection quantity of the fuel by the fuel injector 30 can be correctly taken.

The injection pulse Tip (injection command value) for the fuel injector 30 at the time of the partial lift injection is corrected on the basis of the valve closing timing of the needle 33. For this reason, variations in the lift amount by the partial lift injection can be corrected and hence the control accuracy of the injection quantity can be improved.

In the case where the injection characteristics of all fuel injectors 30 are learned in the specified driving state of the engine 11, the injection characteristics are updated, whereas in the case where the injection characteristics of all fuel injectors 30 are not learned in the specified driving state of the engine 11, the injection characteristics are not updated. For this reason, it is possible to restrain the driving state of the engine 11 at the time of learning the injection characteristic from being different among the fuel injectors 30 of the respective cylinders 21 and hence to restrain the learning accuracy of the injection characteristic from being different for each fuel injector 30.

By calculating the first filter voltage Vsm1, which is generated by filtering the minus terminal voltage Vm of the fuel injector 30 by the first low pass filter, during performing the partial lift injection (at least after the injection pulse of the partial lift injection is turned off), the first filter voltage Vsm1 from which the noise component is removed can be calculated. Further, by calculating the second filter voltage Vsm2 which is generated by filtering the minus terminal voltage Vm of the fuel injector 30 by the second low pass filter, the second filter voltage Vsm2 for detecting the voltage inflection point can be calculated.

By calculating the difference Vdiff between the first filter voltage Vsm1 and the second filter voltage Vsm2 and by calculating the time, which passes from the timing (base timing) when the injection pulse is switched from off to on to the timing when the difference Vdiff becomes more than the threshold value Vt, as the voltage inflection point time Tdiff, the voltage inflection point time Tdiff which changes according to the valve closing timing of the fuel injector 30 can be calculated with high accuracy.

The digital filters are used respectively as the first low pass filter and the second low pass filter, so that the first low pass filter and the second low pass filter can be easily implemented.

The injector driving IC 48 (operation part 49) is made to function as a filter voltage acquiring means, a difference calculating means, and a time calculating means, so that only by changing the specifications of the injector driving IC 48 of the ECU 40, the functions of the filter voltage acquiring means, the difference calculating means, and the time calculating means can be realized and the operation load of the engine controlling microcomputer 41 can be reduced.

The voltage inflection point time Tdiff can be calculated with high accuracy by using the timing when the injection pulse of the partial lift injection is switched from off to on as the base timing.

The calculation of the voltage inflection point time Tdiff is started after the voltage inflection point time Tdiff is reset at the base timing, and the calculation of the voltage inflection point time Tdiff is finished at the timing when the difference Vdiff between the first filter voltage Vsm1 and the second filter voltage Vsm2 becomes more than the threshold value Vt, and the calculated value of the voltage inflection point time Tdiff is held until the next base timing. For this reason, the calculated value of the voltage inflection point time Tdiff can be held from the timing when the calculation of the voltage inflection point time Tdiff is finished to the next base timing, so that a period during which the engine controlling microcomputer 41 can acquire the voltage inflection point time Tdiff can be extended.

In this regard, the embodiment described above can be carried out in following modified manners.

It is also considered that the injection characteristic of the fuel injector 30 is learned on the basis of the output value of the emission gas sensor 24. However, in the partial lift injection, an air quantity and an injection quantity in the combustion becomes small and hence it cannot be avoided that the accuracy with which the injection characteristic is learned is deteriorated. Further, just after the engine 11 is started, the emission gas sensor 24 is not yet activated and hence the injection characteristic of the fuel injector 30 cannot be learned on the basis of the output value of the emission gas sensor 24. In this point, the voltage inflection point time Tdiff can be learned as the parameter that identifies the timing when the needle 33 returns to the lift start point. For this reason, even if the injection characteristic of the fuel injector 30 is learned just after the engine 11 is started, it is possible to restrain the accuracy with which the injection characteristic is learned from being impaired.

In the embodiment described above, in the specified driving state of the engine 11, in the case where the injection characteristics of all fuel injectors 30 are learned, the injection characteristic is updated, whereas in the case where the injection characteristics of all fuel injectors 30 are not learned, the injection characteristic is not updated. However, it is also possible that every time when the driving state of the engine 11 is brought into the specified driving state, the injection characteristic of each fuel injector 30 is individually learned and updated.

In the embodiment described above, the difference Vdiff between the first filter voltage Vsm1 and the second filter voltage Vsm2 is calculated and the time which passes from the timing (base timing) when the injection pulse is switched from off to on to the timing when the difference Vdiff becomes more than the threshold value Vt is calculated as the voltage inflection point time Tdiff. However, the voltage inflection point time Tdiff can be also calculated in the following manner.

A third filter voltage Vdiff.sm3, which is generated by filtering the difference Vdiff by a third low pass filter, is calculated, and a fourth filter voltage Vdiff.sm4, which is generated by filtering the difference Vdiff by a fourth low pass filter, is calculated, and a difference between the third filter voltage Vdiff.sm3 and the fourth filter voltage Vdiff.sm4 is calculated as a second-order difference Vdiff2. By using the timing when the second-order difference Vdiff2 becomes an extreme value (timing when the second-order difference Vdiff2 does not increase) as the timing when the difference Vdiff becomes an inflection point, the voltage inflection point time Tdiff is calculated. According to this configuration, the voltage inflection point time Tdiff changing according to the valve closing timing of the fuel injector 30 can be calculated with high accuracy, and the voltage inflection point time Tdiff can avoid the effect of an offset misalignment of a terminal voltage waveform caused by variations in the circuit.

The voltage inflection point time Tdiff is calculated by using the timing when the injection pulse of the partial lift injection is switched from on to off as the base timing. According to this configuration, the voltage inflection point time Tdiff can be calculated with high accuracy by using the timing when the injection pulse is switched from on to off as the base timing. Further, as compared with the case where the timing when the injection pulse is switched from off to on is used as the base timing, a period during which the calculated value of the voltage inflection point time Tdiff is held can be extended and the period during which the engine controlling microcomputer 41 can acquire the voltage inflection point time Tdiff can be further extended.

The voltage inflection point time Tdiff is calculated by using the timing, when the minus terminal voltage Vm of the fuel injector 30 becomes smaller than a specified value Voff after the injection pulse of the partial lift injection is turned off, as the base timing. According to this configuration, the voltage inflection point time Tdiff can be calculated with high accuracy by using the timing, when the minus terminal voltage Vm of the fuel injector 30 becomes smaller than the specified value Voff after the injection pulse is turned off, as the base timing. Further, as compared with the case where the timing when the injection pulse is switched from off to on is used as the base timing, the period during which the calculated value of the voltage inflection point time Tdiff is held can be extended and the period during which the engine controlling microcomputer 41 can acquire the voltage inflection point time Tdiff can be still further extended.

The time which passes from the timing when the injection pulse is switched from on to off to the timing when the difference Vdiff between the first filter voltage Vsm1 and the second filter voltage Vsm2 becomes smaller than the specified threshold value Vt can be also calculated as the voltage inflection point time Tdiff.

Figure 12:
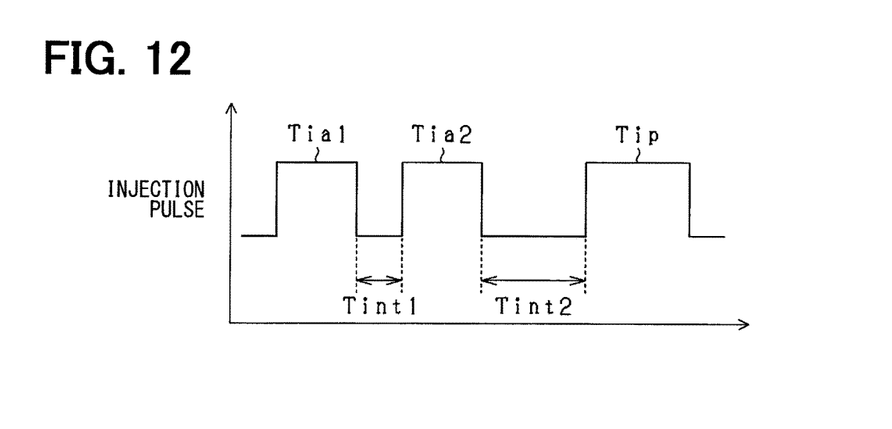
FIG. 12 is a time chart to show a modified example of an injection pulse and an injection interval.

As shown in FIG. 12, the adjusting injection quantity of fuel may be injected by an injection pulse Tia1 of a first adjusting injection and by an injection pulse Tia2 of a second adjusting injection, and then a specified quantity of fuel may be injected by an injection pulse Tip of the partial lift injection at the timing when the injection interval Tint passes. Then, the adjusting injection quantity is set in such a way that the total sum of the adjusting injection quantity (an injection quantity by the injection pulse Tia1+an injection quantity by the injection pulse Tia2) and the specified injection quantity becomes the request injection quantity. In other words, the adjusting injection quantity of fuel may be injected by a plurality of adjusting injections. Also according to this configuration, the same operation and effect as the embodiment described above can be produced.

Figure 13:
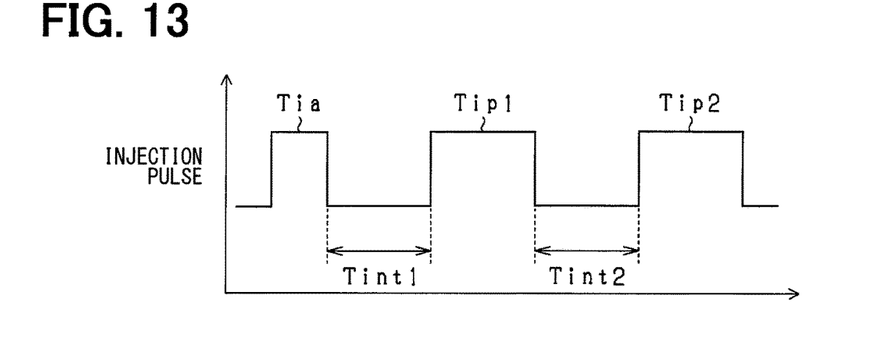
FIG. 13 is a time chart to show another modified example of an injection pulse and an injection interval.

As shown in FIG. 13, it is also recommended to inject the adjusting injection quantity of fuel by the injection pulse Tia of the adjusting injection, and then to inject the fuel of a half of the specified quantity by the injection pulse Tip1 of the first partial lift injection when the injection interval Tint1 passes, and then to inject the fuel of a remaining half of the specified quantity by the injection pulse Tip2 of the second partial lift injection when the injection interval Tint2 passes. Then, the adjusting injection quantity is set in such a way that the total sum of the adjusting injection quantity and the specified injection quantity (an injection quantity by the injection pulse Tia1+an injection quantity by the injection pulse Tia2) becomes the request injection quantity. In other words, the specified injection quantity of fuel may be injected by a plurality of partial lift injections. According to this configuration, in addition to the same operation and effect as the embodiment described above, the injection characteristic of the fuel injector 30 can be learned twice during one combustion stroke. Here, in this case, a preceding stage injection performed before the first partial lift injection is the adjusting injection and a preceding stage injection performed before the second partial lift injection is the first partial lift injection.

Figure 14:
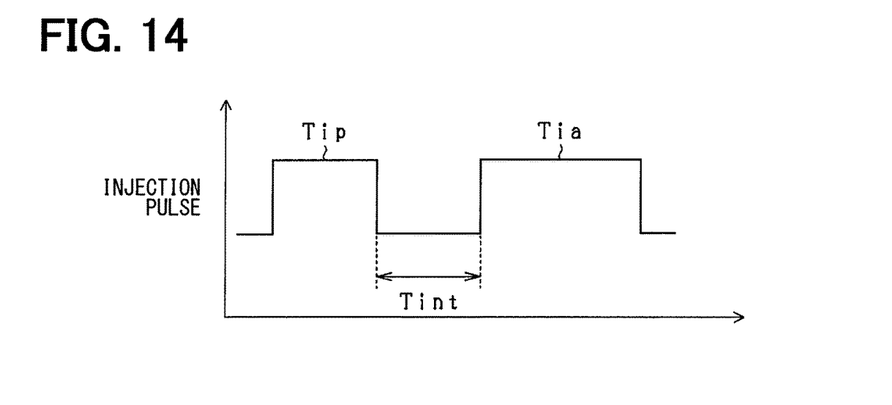
FIG. 14 is a time chart to show still another modified example of an injection pulse and an injection interval.

As shown in FIG. 14, the specified injection quantity of fuel may be injected by the injection pulse Tip of the partial lift injection, and then when the injection interval Tint passes, the adjusting injection quantity of fuel may be injected by the injection pulse Tia of the adjusting injection. Then, the adjusting injection quantity is set in such a way that the total sum of the specified injection quantity and the adjusting injection quantity becomes the request injection quantity. In this case, there is no problem even if the state change of the needle 33 (driving coil 31) by the partial lift injection affects the adjusting injection, so that the injection interval Tint can be arbitrarily set. Here, in this case, there is no preceding stage injection performed before the partial lift injection.

In the embodiment described above, the amount by which the lift of the needle 33 is finished at the specified position just before the needle 33 reaching the full lift position is set as the specified injection quantity injected by the partial lift injection. However, as the specified injection quantity can be also employed an amount by which the lift of the needle 33 is finished at a position of ¾ of the full lift amount or an amount by which the lift of the needle 33 is finished at a position of ½ of the full lift amount.

In the embodiment described above, the voltage inflection point time is calculated by the use of the minus terminal voltage Vm of the fuel injector 30. However, the present disclosure is not limited to this_but the voltage inflection point time may be calculated by the use of a plus terminal voltage Vp of the fuel injector 30.

The fuel injection control device described above can be applied not only to the gasoline engine of the direct injection type but also to a diesel engine. Further, the fuel injection control device described above can be applied not only to a system provided with a fuel injector 30 for a direct injection but also to a system provided with a fuel injector for an intake port injection.

The invention claimed is:

1. A fuel injection control device that is a control device controlling an injection of fuel by a fuel injector, the fuel injection control device comprising:
  a setting part configured to set a request injection quantity of an injection quantity requested of the fuel injector;
  a dividing part configured to divide the request injection quantity set by the setting part into a specified injection quantity and an adjusting injection quantity other than the specified injection quantity;
  an injection performing part configured to perform a dividing injection of an adjusting injection and a partial lift injection by the fuel injector, the adjusting injection injecting the adjusting injection quantity of fuel, the partial lift injection finishing a lift of a valve body of the fuel injector in a partial lift state before the valve body reaching a full lift position and injecting the specified injection quantity of fuel, the partial lift injection being performed, irrespective of the request injection quantity, for learning an injection characteristic of the fuel injector, the adjusting injection quantity being adjustable for making up the request injection quantity so that a total sum of the adjusting injection quantity and the specified injection quantity becomes the request injection quantity; and
  a learning part configured to learn an injection characteristic of the fuel injector at the time of the partial lift injection.

2. The fuel injection control device according to claim 1, wherein the injection performing part is configured to perform the adjusting injection before the partial lift injection.

3. The fuel injection control device according to claim 2, wherein the injection performing part is configured to set a specified interval in which a state change of the valve body by a preceding stage injection is settled between the preceding stage injection and the partial lift injection, the preceding state being performed before the partial lift injection.

4. The fuel injection control device according to claim 1, wherein the dividing part is configured to set an amount, by which a lift of the valve body is finished at a specified position just before the valve body reaching the full lift position, as the specified injection quantity.

5. The fuel injection control device according to claim 1, wherein the injection characteristic is a parameter that identifies a timing when the valve body lifted by the partial lift injection returns to a lift start position.

6. The fuel injection control device according to claim 1, comprising
a correction part configured to correct an injection command value for the fuel injector at the time of the partial lift injection on the basis of the injection characteristic learned by the learning part.

7. The fuel injection control device according to claim 1, wherein the fuel injector is provided in each cylinder of a multi-cylinder internal combustion engine, and wherein the learning part is configured to update the injection characteristic on a condition that the learning part learns the injection characteristic of all of the fuel injectors in a specified driving state of the engine.

8. The fuel injection control device according to claim 7, wherein the learning part is configured to learn the injection characteristic of the fuel injector just after the engine is started.

9. The fuel injection control device according to claim 1, wherein:
the injection characteristic is a parameter that identifies a valve body closing timing; and
the fuel injection control device further comprises an operational part configured to execute a voltage inflection point calculation to identify the valve body closing timing.

10. The fuel injection control device according to claim 1, wherein
the injection performing part is configured to perform a plurality of partial lift injections.

11. The fuel injection control device according to claim 1, wherein
the injection performing part is configured to perform a plurality of adjusting injections.

12. The fuel injection control device according to claim 1, wherein
the injection performing part is configured to perform a plurality of partial lift injections and a plurality of adjusting injections.

* * * * *